US005851719A

United States Patent [19]

Takei et al.

[11] Patent Number: 5,851,719

[45] Date of Patent: Dec. 22, 1998

[54] DEVELOPING SLEEVE FOR ELECTROPHOTOGRAPHY AND PROCESS FOR IMAGE FORMATION

[75] Inventors: Masayuki Takei; Yuichi Yashiki; Hideyuki Akagi; Naoki Ohta; Yasushi Sakata; Junichi Tomonaga, all of Minami-ashigara, Japan

[73] Assignee: Fuji Xerox Co., Ltd., Tokyo, Japan

[21] Appl. No.: 766,343

[22] Filed: Dec. 16, 1996

[30] Foreign Application Priority Data

Dec. 18, 1995 [JP] Japan .................................... 7-328891

[51] Int. Cl.[6] ........................... G03G 15/14; B29D 22/00

[52] U.S. Cl. ..................... 430/126; 428/36.4; 428/36.91; 399/276

[58] Field of Search ............................... 428/36.4, 36.91; 399/276; 430/126

[56] References Cited

U.S. PATENT DOCUMENTS

| | | | |
|---|---|---|---|
| 3,863,603 | 2/1975 | Buckley et al. | 399/276 |
| 4,034,709 | 7/1977 | Fraser et al. | 399/276 |
| 5,147,696 | 9/1992 | Landsbury et al. | 428/36.4 |
| 5,563,690 | 10/1996 | Hasegawa et al. | 399/276 |
| 5,567,494 | 10/1996 | Ageishi et al. | 428/36.91 |

FOREIGN PATENT DOCUMENTS

| | | |
|---|---|---|
| A-1-276174 | 11/1989 | Japan . |
| A-1-277265 | 11/1989 | Japan . |
| A-2-105183 | 4/1990 | Japan . |

OTHER PUBLICATIONS

Schaffert, R.M. Electrophotography. New York: John Wiley & Sons. pp. 557–560, 1975.

*Primary Examiner*—Christopher D. Rodee
*Attorney, Agent, or Firm*—Oliff & Berridge, PLC

[57] ABSTRACT

A developing sleeve for electrophotography is disclosed which has a coating film comprising electroconductive and preferably lubricating particles dispersed in an acrylic resin in which the content of components having a molecular weight lower than 500 is not higher than 3% by weight. The developing sleeve is effective in preventing development ghosts while preventing toner dusting during transfer from becoming worse and has a small environmental dependence of developing properties.

12 Claims, 2 Drawing Sheets

DEVELOPING SLEEVE FOR ELECTROPHOTOGRAPHY AND PROCESS FOR IMAGE FORMATION

FIELD OF THE INVENTION

The present invention relates to a developing sleeve for electrophotography for use in the developing device of an electrophotographic apparatus such as, for example, a copier or a printer. The present invention further relates to a process for image formation using the developing sleeve.

BACKGROUND OF THE INVENTION

In electrophotographic apparatuses, an electrostatic latent image formed on a photoreceptor drum is developed with a developing toner and the resulting toner image is transferred to receiving paper to output an image. In a developing device employing a one-component magnetic toner, the toner is fed to the surface of a rotating cylindrical developing sleeve and frictionally charged on the sleeve with a charging blade to thereby cause toner particles to fly to the drum surface to conduct development. In order to satisfactorily conduct development, toner particles should be caused to fly in amounts corresponding to the electrostatic potentials of the photoreceptor drum. However, in the case of using a toner having a small particle diameter or a toner having high electrification performance, the toner on a sleeve has a developing ability distribution according to the development history of the toner, and this may inhibit toner particles from flying according to potentials. This is called a development ghost phenomenon, the cause of which can be qualitatively explained as follows.

FIG. 1 is a diagrammatic view showing the constitution of a developing device. A one-component magnetic toner 5 stored in a toner hopper 3 is attracted to a developing sleeve 1 by means of the magnetic force of a magnet 2. On the developing sleeve, the toner present in the part close to a photoreceptor drum 6 is used for development, during which only the toner particles present in the areas corresponding to a latent image formed on the photoreceptor drum are consumed. As a result of the rotation of the developing sleeve, fresh toner particles are fed to those areas where toner particles were consumed. The freshly fed toner particles are frictionally charged with a charging blade once, whereas the toner particles present in those areas of the developing sleeve where no toner particles were consumed repeatedly undergo frictional charging. Consequently, the toner on the developing sleeve comes to have a charge amount distribution according to the history of development, and hence has unevenness of developing ability.

Since the circumferential length of a sleeve is generally shorter than the length of receiving paper, the sleeve makes two or more revolutions during development for a sheet of receiving paper. However, development with a toner having the unevenness of developing ability as described above produces an image besides the image corresponding to the electrostatic latent image. In the case where the toner particles present in the areas used for character development have high developing ability, a positive ghost generates in the position corresponding to the length L of the circumference of the sleeve, as shown in FIG. 3. In the reverse case, a negative ghost results as shown in FIG. 4.

Therefore, for preventing the generation of development ghosts, it is necessary to eliminate the difference in charge amount between the toner particles freshly fed after toner consumption and the toner particles remaining unconsumed. That is, the toner on a developing sleeve should maintain a constant charge amount irrespective of the number of charging operations with a charging blade.

A technique for preventing development ghosts was proposed which comprised forming a thin resin layer containing fine electroconductive particles on the surface of a developing sleeve to thereby control the amount and electrification characteristics of a toner fed to the developing sleeve based on the roughness and electroconductivity of the sleeve surface (see JP-A-1-276174, JP-A-1-277265, and JP-A-2-105183). (The term “JP-A” as used herein means an “unexamined published Japanese patent application.”)

Although such a resin layer is effective in preventing development ghosts, the toner charge amount obtainable with this prior art sleeve tends to be smaller than the toner charge amount necessary for inhibiting toner dusting during transfer. It has hence been a problem that the prevention of development ghosts results in worsened toner dusting during transfer. Another drawback of the prior art sleeve is that it is difficult to maintain constant developing properties under all conditions ranging from a high-temperature high-humidity atmosphere to a low-temperature low-humidity atmosphere.

SUMMARY OF THE INVENTION

An object of the present invention is to provide a developing sleeve which is effective in preventing development ghosts while preventing toner dusting during transfer from becoming worse and has a small environmental dependence of developing properties to thereby eliminate the problems described above.

The present invention has succeeded in eliminating the above-described problems by employing the following constitutions.

(1) A developing sleeve for electrophotography comprising a sleeve substrate having provided thereon a coating film including particles dispersed in an acrylic resin, wherein the acrylic resin have a component having a molecular weight of 500 or lower in an amount of 3.5% by weight.

(2) The developing sleeve for electrophotography as described in (1) above, wherein the acrylic resin have a weight-average molecular weight of from 10,000 to 200,000.

(3) The developing sleeve for electrophotography as described in (1) or (2) above, wherein a melamine resin, a guanamine resin or a bead thereof is added to the acrylic resin.

(4) The developing sleeve for electrophotography as described in any one of (1) to (3) above, wherein the particles are electroconductive or electrosemiconductive.

(5) The developing sleeve for electrophotography as described in any one of (1) to (4) above, wherein the particles works for charging a toner to reverse polarity.

(6) The developing sleeve for electrophotography as described in any one of (1) to (5) above, wherein the acrylic resin has lubricating properties.

(7) The developing sleeve for electrophotography as described in any one of (1) to (6) above, wherein the particles are made of at least one selected from the group consisting of molybdenum disulfide, tungsten disulfide, boron nitride and graphite.

(8) The developing sleeve for electrophotography as described in (7) above, wherein the particles are made of molybdenum desulfide.

(9) The developing sleeve for electrophotography as described in any one of (1) to (8) above, wherein the particles have an average particle diameter of form 0.01 to 10 $\mu$m

(10) The developing sleeve for electrophotography as described in any one of (1) to (9) above, wherein the proportion of the particles to the acrylic resin is from 1/5 to 2/1.

(11) The developing sleeve for electrophotography as described in any one of (1) to (10) above, wherein the coating film has a thickness of from 0.5 to 1,000 μm.

(12) A melamine resin or melamine beads may be added to the acrylic resin described in (1) above for the purpose of regulating toner electrification characteristics.

(13) A process for image formation which comprises the steps of forming an electrostatic latent image on an electrostatic-latent-image holder, developing the latent image with a developer on a developer holder to form a developed toner image and transferring the developed toner image to a receiving material, wherein the developer holder is a developing sleeve for electrophotography as described in (1) to (12) above.

DETAILED DESCRIPTION OF THE INVENTION

The present invention has succeeded in providing a developing sleeve for electrophotography which is effective in preventing development ghosts while preventing toner dusting during transfer from becoming worse and has a small environmental dependence of developing properties, by forming a coating film comprising particles dispersed in an acrylic resin in which the content of components having a molecular weight of 500 or lower is not higher than 3.5% by weight. In the present invention, the components having a molecular weight of 500 or lower mean unreacted monomers, polymerization initiators, and low polymers.

Figure 1:
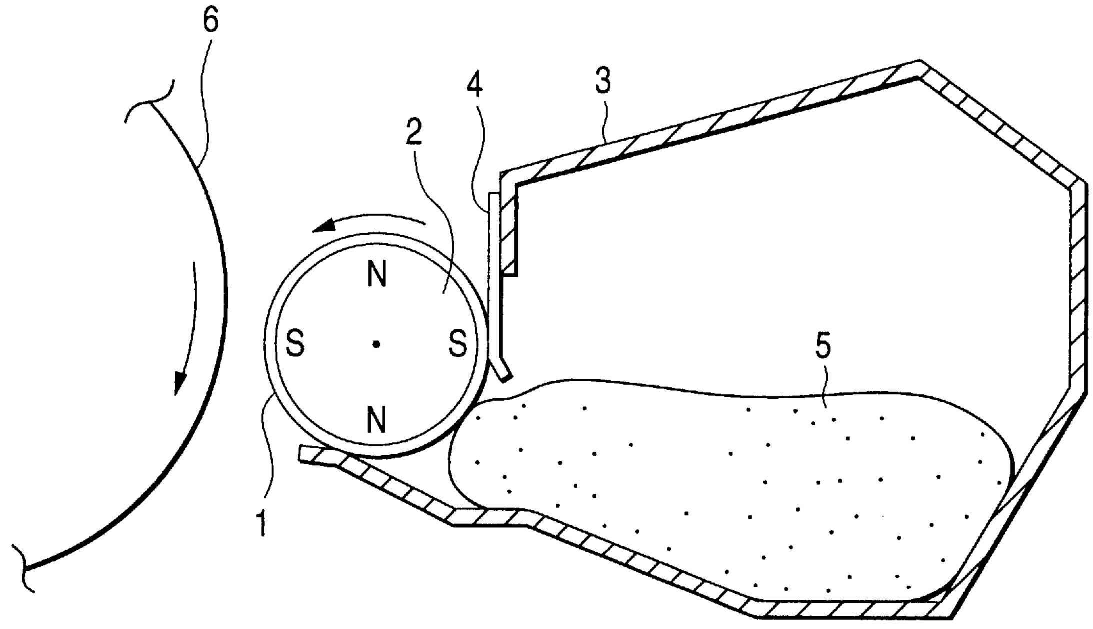
FIG. 1 is a diagrammatic view showing the constitution of a developing device.
Figure 2:
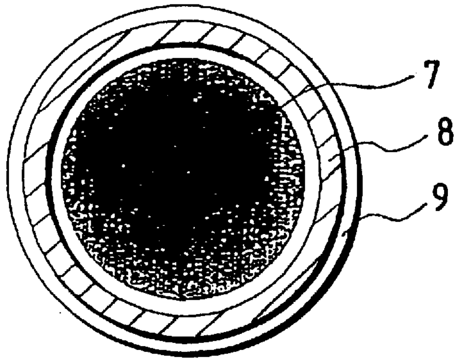
FIG. 2 is a cross-sectional view of a developing sleeve of the present invention for use in a developing device.
Figure 3:
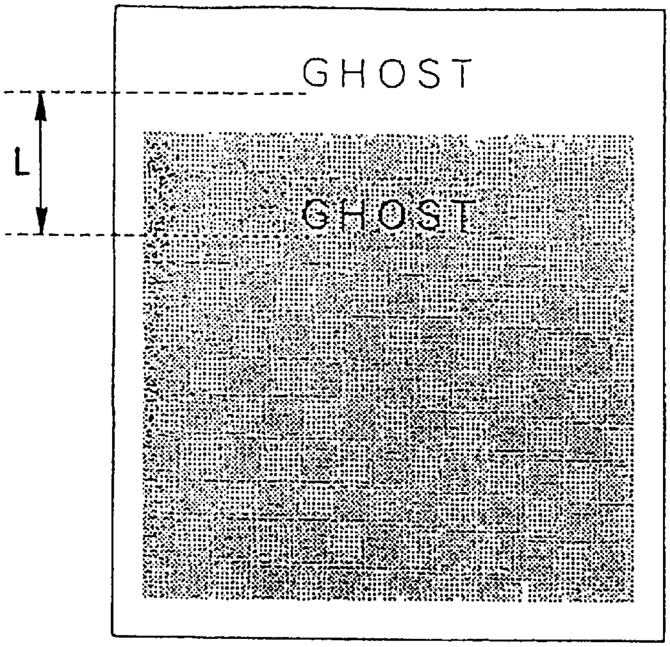
FIG. 3 PRIOR ART
FIG. 3 is a view showing a print obtained with a conventional developing device and bearing a positive ghost.
Figure 4:
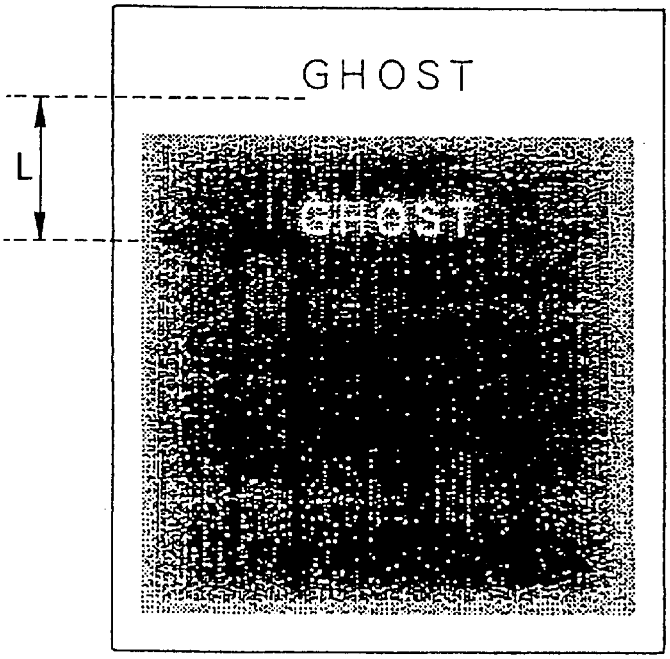
FIG. 4 PRIOR ART
FIG. 4 is a view showing a print obtained with a conventional developing device and bearing a negative ghost.

An example of the developing sleeve of the present invention is shown in FIG. 2. A cylindrical hollow sleeve substrate 8 is disposed around a magnet 7 and has on the surface thereof a resin coating layer, which is a feature of the present invention.

Examples of the acrylic resin used in the present invention include poly(methyl methacrylate) (PMMA), copolymers of methyl methacrylate with other acrylic esters, and copolymers of methyl methacrylate with vinyl monomers, e.g., styrene.

Examples of the acrylic monomers include methyl (meth)acrylate, ethyl (meth)acrylate, butyl (meth)acrylate, dodecyl (meth)acrylate, octyl (meth)acrylate, and phenyl (meth)acrylate.

Examples of usable other vinyl monomers include styrene and derivatives thereof such as chlorostyrene; monoolefins such as ethylene, propylene, butylene, and isoprene; and vinyl esters such as vinyl acetate, vinyl propionate, vinyl benzoate, and vinyl butyrate.

In the case of a copolymer, it should contain at least 50 parts by weight of units derived from one or more acrylic monomers such as those enumerated above.

A developing sleeve should be capable of keeping the frictional electrification characteristics of a toner constant irrespective of fluctuations of environmental conditions. However, if an impurity is present in the resin constituting the coating layer, it may reduce the electrification level or greatly enhance the environmental dependence of electrification characteristics. Investigations made by the present inventors revealed that in acrylic resin coating layers, impurities which especially greatly influence electrification characteristics are components having a molecular weight of 500 or lower. Such impurities include residues of unreacted monomers, polymerization initiators, and low polymers. If the total amount of these impurities exceeds 3.5% by weight, electrification characteristics decrease.

According to the present invention, by regulating the acrylic resin so as to have a content of components having a molecular weight of 500 or lower to 3.5% by weight or lower, it has become possible to obtain stable electrification characteristics and prevent the charge amount from decreasing. The content of components having a molecular weight of 500 or lower in the acrylic resin is especially preferably regulated to 1.5% by weight or lower. The content of components having a molecular weight of 500 or lower can be determined by liquid chromatography using butanol as a solvent.

For reducing the content of components having a molecular weight of 500 or lower in an acrylic resin yielded by solution polymerization to 3.5% by weight or lower, use may be made of a method comprising precipitating the resin from a poor solvent such as a lower alcohol, e.g., methanol, or an aliphatic hydrocarbon, e.g., hexane, a method comprising drying and then heating the resin, or a method comprising drying the resin under a reduced pressure.

The weight-average molecular weight, $M_w$, of the acrylic resin used in the present invention is desirably from 10,000 to 200,000, preferably from 40,000 to 100,000. Too low weight-average molecular weights thereof result in enhanced coating film wear and a reduced sleeve life. On the other hand, too high weight-average molecular weights thereof are undesirable in the such acrylic resins give solutions which have an exceedingly high viscosity and are difficult to apply to a sleeve.

When the developing sleeve having an acrylic resin coating according to the present invention is used in a laser printer for frictionally charging a toner or the negative electrification type, the toner is correctly charged negatively. Although developing sleeves employing some kinds of resins, e.g., polyurethanes and polycarbonates, cause the toner to be incorrectly charged, such resins are undesirable because they tend to reduce developing properties. In the case of adding such a resin, the acrylic resin should be contained in an amount of at least 50% by weight, preferably at least 70% by weight.

According to the present invention, by incorporating particles into the acrylic resin constituting the developing-sleeve coating film, it is possible to enhance the strength of the coating film itself and the adhesion thereof to the sleeve base to thereby improve durability and electrification stability. Further, when the particles incorporated function to incorrectly charge a toner, not only the amount of charges generated by friction between the toner and the acrylic resin coating film is inhibited from increasing with the increasing number of frictional operations, but also the amount of frictionally generated charges can be kept on a certain level while preventing the toner surface from having unevenness of charge density. Specifically, the toner charge amount for the whole coating film can be regulated to a value suitable for development by selecting the content of the particles, the negative electrification characteristics of the particles, and the kind and amount of polar groups contained in the developing-sleeve coating resin.

It has further been found that adding a melamine resin or melamine beads to the acrylic resin according to the present invention is effective in stabilizing the toner charge amount in continuous long-term use. The melamine resin used here is a melamine resin for coating use which is generally obtained by condensing melamine with formalin and etherifying the resulting methylolmelamine with an alcohol. Examples thereof include trimethylolmelamine (n- or iso) butyl ether and hexamethylolmelamine (n- or iso)butyl ether. On the other hand, the melamine beads are obtained by forming the melamine resin into spherical particles and curing the particles.

The guanamine resin may be formed in the same manner as the melamine resin except for using guanamine in place of melamine.

Although melamine resins and guanamine resins are usually used as crosslinking agents for thermosetting resins, the melamine resin used in the present invention is intended to function as an additive for stabilizing electrification and need not react.

The addition amount of the melamine resin, melamine resin or beads thereof is preferably about from 1 to 30% by weight, more preferably 1 to 20% by weight, based on the amount of the acrylic resin. Hereinafter, the term "acrylic resin" often means an acrylic resin containing a melamine resin or guanamine resin or beads thereof. The addition of a melamine resin or guanamine resin or beads thereof is effective in more stabilizing the negative electrification of a toner. The reason for this may be as follows. Since the amino groups contained in melamine resin and guanamine resin molecules undergo strong positive polarization, the presence of such amino groups in the sleeve coating film prevents the decrease in toner charge amount caused during long-term continuous use by an oppositely charged material contained in the coating film, and thereby stabilizes the amount of toner charges. In particular, a system containing melamine beads is effective in preventing the decrease in toner charge amount caused by an increase in the amount of an exposed oppositely charged material as a result of the wear of a coating film surface.

According to the present invention, by incorporating electroconductive or semiconductive particles into the coating resin of the developing sleeve, electroconductivity or semiconductivity can be imparted to the coating film, whereby the accumulation of counter charges generated on the sleeve side by toner flying can be prevented.

Examples of the electroconductive or semiconductive particles usable in the present invention include titanium oxide, tin oxide, and carbon black.

In order to prevent wear, electroconductive or semiconductive particles having lubricating properties are desirably incorporated into the coating film of the developing sleeve of the present invention. Examples of particles which have those properties include molybdenum disulfide ($MoS_2$), tungsten disulfide ($WS_2$), boron nitride, and graphite. $MoS_2$ not only has the effect of diminishing friction by the intercrystalline van der Waals force to exhibit lubricating properties, but also has semiconductive properties with a resistivity of from $10^5$ to $10^7$ Ωcm. A mixture of two or more of those particulate materials may be used.

The particles used in the present invention may have an average particle diameter of 0.01 to 10 μm, preferably from 0.05 to 5 μm, more preferably from 0.1 to 2 μm. Due to such particle diameter range, the particles can be evenly dispersed in the resin.

The proportion of the particles to the resin in the coating film of the developing sleeve of the present invention cannot be fixed unconditionally, because it varies depending on the toner-charging properties of the developing sleeve. However, from the standpoints of coating film strength and stable production, the particle/resin ratio is desirably from 1/5 to 2/1 by weight.

The thickness of the coating film is desirably from 0.5 to 1,000 μm, preferably from 0.5 to 100 μm, more preferably from 1 to 20 μm, although it varies depending on the incorporation amount of the particles.

The material of the sleeve base (substrate) may be a metal such as, e.g., aluminum, an aluminum alloy, or stainless steel. These materials are shaped into a cylindrical form by extrusion, etc.

The formation of a coating film on the sleeve can be accomplished by dispersing the particles into a solution of an acrylic resin by a desired method and applying the dispersion to the sleeve by ring coating, dip coating, spray coating, etc.

Examples of usable solvents for the resin include aromatic hydrocarbons such as toluene and xylene, ketones such as acetone and butanone, and esters such as ethyl acetate and butyl acetate.

In using the developing sleeve of the present invention for development, a thin layer of a one-component developer is formed on the surface of the sleeve, and developer particles are caused to move from the thin layer onto a latent image formed on an electrostatic latent-image holder while or without keeping the thin layer in contact with the latent image.

The developer used above may be a magnetic developer or a nonmagnetic developer. The one-component developer specifically contains a binder resin and a colorant as essential components.

Examples of the binder resin for use in the one-component developer include homopolymers and copolymers of: styrene and styrene derivatives such as chlorostyrene and vinylstyrene; vinyl esters such as vinyl acetate, vinyl propionate, vinyl benzoate, and vinyl butyrate; esters of aliphatic α-methylene monocarboxylic acids, such as methyl (meth)acrylate, ethyl (meth)acrylate, butyl (meth) acrylate, dodecyl (meth)acrylate, octyl (meth)acrylate, and phenyl (meth)acrylate; vinyl ethers such as vinyl methyl ether, vinyl ethyl ether, and vinyl butyl ether; and vinyl ketones such as vinyl methyl ketone. Examples of the binder resin further include polyesters, polyurethanes, epoxy resins, silicone resins, and polyamides. Especially representative binder resins include polystyrene, styrene/alkyl (meth) acrylate copolymers, styrene/acrylonitrile copolymers, styrene/butadiene copolymers, and styrene/maleic anhydride copolymers. However, the binder resin used in the one-component developer is not limited to these examples.

Representative examples of the colorant include carbon black and dyes or pigments such as nigrosine, aniline blue, chalcoyl blue, chrome yellow, ultramarine blue, Dupont Oil Red, quinoline yellow, methylene blue chloride, phthalocyanine blue, malachite green oxalate, lamp black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Blue 15:1, and C.I. Pigment Blue 15:3.

Examples of magnetic materials usable in the magnetic developer include metals such as iron, cobalt, and nickel, alloys of these metals, metal oxides such as $Fe_3O_4$, $\gamma Fe_2O_3$, and cobalt-doped iron oxides, various ferrites such as Mn—Zn ferrite and Ni—Zn ferrite, magnetite, and hematite. Although the content of a magnetic material is suitably selected, it is generally in the range of from 10 to 80% by weight, preferably from 20 to 70% by weight.

Known additives such as, e.g., a charge control agent, may be incorporated into the one-component developer if desired. Also usable as external additives are a flowability improver such as, e.g., fine colloidal silica particles, a removability improver such as, e.g., a fine powder of an organic substance such as a fatty acid or a derivative or metal salt thereof, a fluororesin, an acrylic resin, or a styrene resin, and fine particles of other inorganic compounds.

The present invention will be explained below in more detail by reference to the following Examples, but the invention should not be construed as being limited thereto.

EXAMPLE 1

To 50 parts of methyl methacrylate (MMA) monomer was added 0.5 parts of azobisisobutyronitrile as a polymerization initiator. This mixture was reacted in 100 parts of toluene at 80° C. for 10 hours to obtain poly(methyl methacrylate) (PMMA) having a weight-average molecular weight of about 60,000. This poly(methyl methacrylate) was dried and then heated at 150° C. for 4 hours to obtain a binder.

This binder was analyzed for the content of components having a molecular weight of 500 or lower by liquid chromatography using butanol as a solvent. As a result, it was found that the content thereof was 3.0% by weight and the low-molecular components consisted of the unreacted monomer, the residual polymerization initiator, and low polymers.

This binder was dissolved in 2-butanone, and the solution was mixed with $MoS_2$ particles having an average particle diameter of 0.4 μm in a binder/$Mos_2$ ratio of 1/2 by means of a sand mill. The resulting dispersion was applied to an aluminum pipe having dimensions of 20 mmϕ by 322 mm by ring coating to form a coating film having a thickness of 10 μm. Thus, a developing sleeve was obtained. The volume resistivity of this developing sleeve was measured and was found to be about $10^{11}$ Ωcm.

EXAMPLE 2

To 50 parts of methyl methacrylate (MMA) monomer was added 0.5 parts of azobisisobutyronitrile as a polymerization initiator. This mixture was reacted in 100 parts of toluene at 80° C. for 10 hours to obtain poly(methyl methacrylate) (PMMA) having a weight-average molecular weight of about 60,000. This poly(methyl methacrylate) was added dropwise to methanol, the amount of the methanol being 10 times that of the toluene, to purify the polymer by precipitation. Thus, a binder was obtained.

This binder was analyzed for the content of components having a molecular weight of 500 or lower in the same manner as in Example 1. As a result, it was found that the content thereof was 1.5% by weight and the low-molecular components consisted of the unreacted monomer, the residual polymerization initiator, and low polymers.

This binder was applied to an aluminum pipe under the same conditions as in Example 1 to obtain a developing sleeve. The volume resistivity of this developing sleeve was about $10^{11}$ Ωcm.

EXAMPLE 3

To the PMMA obtained in Example 1 was added an isobutyl-etherified melamine resin (trade name, Beckamine G821-60; manufactured by Dainippon Ink & Chemicals, Inc., Japan) in an amount of 3% by weight based on the amount of the PMMA. The resulting mixture was applied as a binder resin to an aluminum pipe under the same conditions as in Example 1 to obtain a developing sleeve. The volume resistivity of this developing sleeve was about $10^{11}$ Ωcm.

EXAMPLE 4

To the PMMA obtained in Example 1 were added melamine beads having an average particle diameter of 0.4 μm (trade name, Epostar; manufactured by Nippon Shokubai Kagaku Kogyo Co., Ltd., Japan) in an amount of 10% by weight based on the amount of the PMMA. The resulting mixture was applied as a binder resin to an aluminum pipe under the same conditions as in Example 1 to obtain a developing sleeve. The volume resistivity of this developing sleeve was about $10^{11}$ Ωcm.

COMPARATIVE EXAMPLE 1

The uncoated aluminum pipe used in Example 1 was used as a developing sleeve.

COMPARATIVE EXAMPLE 2

A developing sleeve was obtained by coating an aluminum pipe with a binder in the same manner as in Example 1, except that the addition of $MoS_2$ particles to the binder was omitted. The volume resistivity of this developing sleeve was $10^{15}$ Ωcm.

COMPARATIVE EXAMPLE 3

To 50 parts of methyl methacrylate (MMA) monomer was added 0.5 parts of azobisisobutyronitrile as a polymerization initiator. This mixture was reacted in 100 parts of toluene at 80° C for 10 hours to obtain poly(methyl methacrylate) (PMMA) having a weight-average molecular weight of about 60,000. This polymer was used as a binder. (The binder purification step in Example 1 or 2 was omitted.)

This binder was analyzed for the content of components having a molecular weight of 500 or lower in the same manner as in Example 1. As a result, it was found that the content thereof was 4.0% by weight and the low-molecular components consisted of the unreacted monomer, the residual polymerization initiator, and low polymers.

This binder was mixed with $MoS_2$ particles in a ratio of 1/2 and applied to an aluminum pipe under the same conditions as in Example 1 to obtain a developing sleeve. The volume resistivity of this developing sleeve was about $10^{11}$ Ωcm.

COMPARATIVE EXAMPLE 4

A developing sleeve was obtained in the same manner as in Comparative Example 3, except that the ratio of the binder to $MoS_2$ particles was changed to 2.5/1. The volume resistivity of this developing sleeve was about $10^9$ Ωcm. (Production of Magnetic One-component Toner of Negative

| | |
|---|---|
| Styrene/n-butyl acrylate copolymer carrier (monomer ratio, 80/20; $M_w$, 130,000; MI, 14; $T_g$, 59° C.) | 45.8 parts by weight |
| Magnetic material (hexahedral magnetite; particle diameter, 0.19 μm) | 50 parts by weight |
| Negative-charge control agent (Cr azo dye) | 0.7 parts by weight |

-continued

| | |
|---|---|
| Low-molecular polypropylene (softening point, 148° C.) | 2.7 parts by weight |
| Low-molecular polyethylene (softening point, 126° C.) | 0.5 parts by weight |

The above ingredients were dry-blended by means of a Henschel mixer, and this powder mixture was kneaded with an extruder set at 120° C. The resulting composition was cooled, subsequently reduced into coarse particles, and then pulverized into fine particles having a 50%-volume diameter $d_{50}$ of 6.5 μm. These particles were classified to obtain particles having a volume diameter $d_{50}$ of 7.5 μm.

To 100 parts by weight of the thus-obtained toner was added 1.0 part by weight of colloidal silica (R972, manufactured by Nippon Aerosil Co., Ltd., Japan) as an external additive using a Henschel mixer. Thus, a magnetic toner was obtained.

[Image Quality Evaluation Test in Low-temperature Low-humidity Atmosphere ]

Each of the developing sleeves obtained in Examples 1to 4 and Comparative Examples 1 to 4 and the magnetic one-component toner of the negative electrification type were fitted or incorporated in a laser printer (XP-20, manufactured by Fuji Xerox Co., Ltd.; output, 20 sheets per minute) details of which are shown below, and an image quality evaluation test was performed in a low-temperature low-humidity atmosphere (10° C., 15% RH) in which development ghosts are apt to generate.

| | |
|---|---|
| Process speed: | 115 mm/sec |
| Circumferential speed ratio of developing sleeve to photoreceptor drum: | 1.17 |
| Development bias: | superimposed voltage consisting of $V_{DC}$ of −240V and $V_{AC}$ of 2.0 $kV_{pp}$ (2.4 kHz sine wave) |
| Potential of photoreceptor drum: | $V_H$, −350 V; $V_L$, −60 V |
| DRS (distance between photoreceptor drum and developing sleeve): | 250 μm |

In the image quality evaluation test, the developing sleeve alone was rotated first to measure the amount of charges possessed by the toner thereon. Developing sleeves on which the amount of charges changes as the number of sleeve revolutions increases lead to fluctuations in the toner amount used for development to cause a ghost.

Subsequently, prints were obtained to evaluate the initial image quality.

The results obtained for each developing sleeve are shown in Table 1. Image quality was evaluated based on the criteria shown in Table 2.

TABLE 1

| | Toner Charge Amount (μC/g) | | | Image Quality (See Table 2) | | |
|---|---|---|---|---|---|---|
| Sample | After 1 revolution | After 10 revolutions | After 20 revolutions | Image density | Ghost | Toner dusting |
| Ex. 1 | −12.3 | −13.5 | −13.5 | 1.41 | ○ | ○ |
| Ex. 2 | −13.5 | −14.3 | −14.5 | 1.43 | ○ | ○ |
| Ex. 3 | −14.5 | −15.2 | −15.6 | 1.43 | ○ | ○ |
| Ex. 4 | −12.9 | −13.6 | −13.9 | 1.44 | ○ | ○ |
| Comp. Ex. 1 | −9.97 | −14.1 | −18.2 | 1.45 | x | ○ |
| Comp. Ex. 2 | −14.4 | −20.5 | −24.3 | 1.42 | x | ○ |
| Comp. Ex. 3 | −8.34 | −8.55 | −8.94 | 1.35 | ○ | Δ |
| Comp. Ex. 4 | +5.83 | +5.95 | +5.98 | — | — | — |

Note)
Low-temperature low humidity (10° C., 15% RH)

TABLE 2

| Symbol | Ghost | Toner dusting |
|---|---|---|
| o | none | better than uncoated Al pipe |
| Δ | — | equal to uncoated Al pipe |
| x | generated | worse than uncoated Al pipe |

(Results of Toner Charge Amount Evaluation)

The developing sleeve of Comparative Example 1, which was an uncoated aluminum pipe, underwent considerable changes in charge amount with the increasing number of sleeve revolutions. The results for the developing sleeve of Comparative Example 2, which was an aluminum pipe coated with PMMA (unpurified PMMA) alone, show that PMMA had the property of correctly (negatively) charging the toner. A comparison between Comparative Example 2 and Comparative Examples 3 and 4 shows that the addition of $MoS_2$ particles to PMMA reduced the toner charge amount, and that increasing the addition amount of $MoS_2$ particles caused a reversal of toner electrification. This indicates that since $MoS_2$ has the property of incorrectly charging the toner, it not only has the effect of increasing electroconductivity, but also is effective in diminishing the dependence of toner charge amount on the number of frictional charging operations with the developing sleeve to impart a stable charge amount, when added in an appropriate amount as in Examples 1 to 4 and Comparative Example 3.

(Results of Image Quality Evaluation of Initial Print)

The developing sleeve of Comparative Example 1, which was an uncoated aluminum pipe, and that of Comparative Example 2, which was an aluminum pipe coated with unpurified PMMA alone, each caused a ghost. The developing sleeves of Comparative Example 3 and Examples 1 to 4, which each had a coating film containing $MoS_2$ particles, each caused no ghosts and no toner dusting during transfer and was hence superior to the uncoated aluminum pipe of Comparative Example 1. Further, the developing sleeves of Examples 1 to 4 gave excellent images with a solid-black density exceeding 1.40, whereas the developing sleeve of Comparative Example 3 gave an image having a solid-black density as low as 1.35, showed a small charge amount, and caused toner dusting. Image density was measured with densitometer X-Rite 404A (manufactured by Amtec Co., Ltd.)

(Image Quality Durability Test in Low-temperature Low-humidity Atmosphere)

Subsequently, the developing sleeves of Examples 1 to 4 and Comparative Example 3 each was used to conduct continuous 4,000-sheet printing in a low-temperature low-humidity (10° C., 15% RH) atmosphere. The print obtained thereafter with each developing sleeve was evaluated for image quality. The results obtained are shown in Table 2'.

(Results of Image Quality Evaluation of Initial Print)

The developing sleeves of Examples 1 to 4 gave images having a solid-black density exceeding 1.40 and were highly reduced in ghost generation and toner dusting during transfer, whereas the developing sleeve of Comparative Example 3 was inferior in toner dusting during transfer due to a decrease in toner charge amount, although satisfactory in solid-black image density.

TABLE 2

| | Toner Charge Amount (μC/g) | | | Image Quality (See Table 2) | | |
|---|---|---|---|---|---|---|
| Sample | After 1 revolution | After 10 revolutions | After 20 revolutions | Image density | Ghost | Toner dusting |
| Ex. 1 | −11.5 | −12.1 | −12.5 | 1.40 | ○ | ○ |
| Ex. 2 | −13.0 | −13.8 | −14.2 | 1.41 | ○ | ○ |
| Ex. 3 | −14.1 | −14.6 | −15.3 | 1.42 | ○ | ○ |
| Ex. 4 | −15.1 | −15.7 | −16.3 | 1.42 | ○ | ○ |
| Comp. Ex. 3 | −8.05 | −8.36 | −8.46 | 1.30 | ○ | ○ |

Note)
Low-temperature low humidity (10° C., 15% RH)

(Results of Image Quality Evaluation after Continuous 4,000-sheet Printing in Low-temperature Low-humidity Atmosphere)

The results for Examples 1 to 4 and Comparative Example 3 show that the initial electrification and image quality were maintained even after 4,000-sheet printing. Further, since these developing sleeves had a coating film containing $MoS_2$ particles dispersed therein, each developing sleeve showed reduced coating film wear and did not suffer fouling by toner or external-additive adhesion due to the lubricity of $MoS_2$.

[Image Quality Evaluation Test in High-temperature High-humidity Atmosphere ]

An image quality evaluation test was performed in the same manner as described above, except that the low-temperature low-humidity atmosphere (10° C., 15% RH) was changed to a high-temperature high-humidity atmosphere (28° C., 85% RH).

(Image Quality Evaluation Test for Initial Print)

The developing sleeves of Examples 1 to 4 and Comparative Example 3, with which electrification and image quality were stable in the low-temperature low-humidity atmosphere, were subjected to a test for evaluating the quality of initial prints. The results obtained are shown in Table 3.

(Image Quality Durability Test in High-temperature High-humidity Atmosphere)

Subsequently, the developing sleeves of Examples 1 to 4 and Comparative Example 3 each was used to conduct continuous 4,000-sheet printing in a high-temperature high-humidity (28° C., 85% RH) atmosphere. The print obtained thereafter with each developing sleeve was evaluated for image quality. The results obtained are shown in Table 3'.

After being used to conduct 4,000-sheet printing, each developing sleeve was evaluated for any change in image density and ghost generation to examine durability in the high-temperature high-humidity atmosphere. As a result, the developing sleeves of Examples 1 and 2 gave prints having excellent image density, generated no ghosts, and caused no toner dusting during transfer. On the other hand, the developing sleeve of Comparative Example 3 caused a large decrease in image density and considerable toner dusting during transfer, although no ghosts generated.

TABLE 3

| | Toner Charge Amount (μC/g) | | | Image Quality (See Table 2) | | |
|---|---|---|---|---|---|---|
| Sample | After 1 revolution | After 10 revolutions | After 20 revolutions | Image density | Ghost | Toner dusting |
| Ex. 1 | −9.95 | −10.0 | −10.8 | 1.43 | ○ | ○ |
| Ex. 2 | −10.6 | −10.8 | −10.9 | 1.44 | ○ | ○ |
| Ex. 3 | −9.04 | −9.66 | −9.86 | 1.44 | ○ | ○ |
| Ex. 4 | −8.95 | −9.07 | −9.16 | 1.45 | ○ | ○ |
| Comp. Ex. 3 | −7.25 | −7.54 | −7.82 | 1.40 | ○ | Δ |

Note)
High-temperature high humidity (28° C., 85% RH)

TABLE 3

| | Toner Charge Amount (μC/g) | | | Image Quality (See Table 2) | | |
|---|---|---|---|---|---|---|
| Sample | After 1 revolution | After 10 revolutions | After 20 revolutions | Image density | Ghost | Toner dusting |
| Ex. 1 | −8.17 | −8.38 | −8.49 | 1.40 | ○ | ○ |
| Ex. 2 | −8.23 | −8.61 | −8.87 | 1.40 | ○ | ○ |
| Ex. 3 | −9.41 | −9.56 | −9.71 | 1.42 | ○ | ○ |
| Ex. 4 | −9.11 | −9.40 | −9.64 | 1.42 | ○ | ○ |
| Comp. Ex. 3 | −2.76 | −3.05 | −3.25 | 1.08 | ○ | Δ |

Note)
High-temperature high humidity (28° C., 85% RH)

(Results of Image Quality Evaluation after Continuous 4,000-sheet Printing in High-temperature High-humidity Atmosphere)

The results show that the developing sleeves of Examples 1 to 4 were satisfactory in charging and image quality even after 4,000-sheet printing, whereas the developing sleeve of Comparative Example 3 caused a large decrease in solid-black density. Although all the developing sleeves of the Examples showed sufficient durability in continuous 4,000 sheet printing as described above, the developing sleeves of Examples 3 and 4 underwent smaller changes in toner charge amount and image density from the respective initial values than those of Examples 1 and 2 and could be used for further printing. Moreover, since these developing sleeves had a coating film containing $MoS_2$ particles dispersed therein, they showed reduced resin coating film wear and did not suffer fouling by toner or external-additive adhesion due to the lubricity of $MoS_2$.

Since the present invention has the constitutions described above, it has become possible to obtain a satisfactory image density and to simultaneously attain the prevention of both development ghost generation and toner dusting during transfer, irrespective of fluctuations of environmental conditions. Further, the incorporation of a melamine resin or melamine beads into the binder resin has made durability improvement possible. Furthermore, when the coating film contains particles having lubricating properties, e.g., $MoS_2$ particles, coating film wear is greatly reduced and, as a result, the fouling caused by the adhesion of toner or external additives can be prevented. In addition, since fine toner particles are prevented from being trapped by a rugged surface of the developing sleeve, the effect of preventing development ghost generation can be maintained over long.

While the invention has been described in detail and with reference to specific embodiments thereof, it will be apparent to one skilled in the art that various changes and modifications can be made therein without departing from the spirit and scope thereof.

What is claimed is:

1. A developing sleeve for electrophotography comprising a sleeve substrate having provided thereon a coating film including particles dispersed in an acrylic resin containing beads of at least one of a melamine resin and a guanamine resin, wherein the acrylic resin comprises a component having a molecular weight of 500 or lower in an amount of 3.5% by weight or lower.

2. The developing sleeve as claimed in claim 1, wherein the acrylic resin have a weight-average molecular weight of from 10,000 to 200,000.

3. The developing sleeve as claimed in claim 1, wherein the particles are conductive particles or semiconductive particles.

4. The developing sleeve as claimed in claim 1, wherein the particles are made of molybdenum disulfide, tungsten disulfide, boron nitride or graphite.

5. The developing sleeve as claimed in claim 1, wherein the particles are made of molybdenum disulfide.

6. The developing sleeve as claimed in claim 1, wherein the particles have an average particle diameter of from 0.01 to 10 μm.

7. The developing sleeve as claimed in claim 1, wherein the proportion of the particles to the acrylic resin is from 1/5 to 2/1.

8. The developing sleeve as claimed in claim 1, wherein the coating film has a thickness of from 0.5 to 1,000 μm.

9. The developing sleeve as claimed in claim 1, wherein the acrylic resin comprises a component having a molecular weight of 500 or lower in an amount of 1.5% by weight.

10. The developing sleeve as claimed in claim 1, wherein the acrylic resin comprises a weight-average molecular weight of from 40,000 to 100,000.

11. The developing sleeve as claimed in claim 1,
wherein the sleeve substrate is a hollow sleeve substrate around a magnet.

12. A process for image formation which comprises the steps of:
forming an electrostatic latent image on an electrostatic-latent-image holder;
developing the latent image with a developer on a developer holder to form a developed toner image; and
transferring the developed toner image to a receiving material,
wherein the developer holder is a developing sleeve comprising a sleeve substrate having provided thereon a coating film including particles dispersed in an acrylic resin containing beads of at least one of a melamine resin and a guanamine resin, wherein the acrylic resin comprises a component having a molecular weight of 500 or lower in an amount of 3.5% by weight or lower.

* * * * *